United States Patent [19]

Appleton

[11] 4,198,091
[45] Apr. 15, 1980

[54] VEHICLE WITH SPACE TRADEABLE BETWEEN REAR SEAT AND TRUNK

[76] Inventor: Arthur I. Appleton, c/o Appleton Elec. Co., 1701 Wellington Ave., Chicago, Ill. 60657

[21] Appl. No.: 924,443

[22] Filed: Jul. 13, 1978

[51] Int. Cl.² ............................................. B60N 1/10
[52] U.S. Cl. ...................... 296/63; 296/69; 297/135
[58] Field of Search .............. 296/63, 69, 37.1, 37.14, 296/37.15, 37.16; 297/129, 136, 135

[56] References Cited

U.S. PATENT DOCUMENTS

| | | | |
|---|---|---|---|
| 2,687,336 | 8/1954 | Smith | 297/191 |
| 3,181,911 | 5/1965 | Peras | 296/37.1 |
| 3,909,060 | 9/1975 | Katayama | 296/76 |
| 4,127,301 | 11/1978 | Syrowik | 296/37.16 |

Primary Examiner—Joseph F. Peters, Jr.
Assistant Examiner—John A. Carroll
Attorney, Agent, or Firm—Jon L. Liljequist

[57] ABSTRACT

An automobile with a conventional and enclosed luggage compartment or trunk includes a forwardly and rearwardly movable, combination partition and rear seat between the passenger compartment and the luggage compartment so as to permit an occupant to trade-off between leg room in the rear seat and trunk volume, depending upon his or her immediate needs.

2 Claims, 2 Drawing Figures

VEHICLE WITH SPACE TRADEABLE BETWEEN REAR SEAT AND TRUNK

BACKGROUND AND SUMMARY OF THE INVENTION

Over the past few years, the traditionally large American automobile has been progressively getting smaller. And, as automobile dimensions shrink, so also does their trunk volume and passenger space. The manner in which some automobile manufacturers have attempted to sidestep this problem is to design vehicles where the luggage carrying space is freely communicable with the passenger space. In this way there is less lost space, as might otherwise be caused by a partition, and luggage space is accessible either from the front of the vehicle or from the rear. Naturally, some owners prefer to keep luggage and other objects carried out of view of the passenger compartment, and it is those needs and desires that have precipitated the present invention.

The present disclosure solves the problem by providing a forwardly and rearwardly movable rear seat that also acts as the partition between the trunk space and the passenger space. At those times when only one or two persons are travelling perhaps on an extended trip, the rear seat can be moved all the way forward so as to provide an extremely large trunk volume. Alternatively, when four or five people are travelling rather short distances without large amounts of luggage, the rear seat can be moved entirely to the rear so as to provide ample and uncramped passenger space in the back seat.

DESCRIPTION OF SPECIFIC EMBODIMENT

Figure 1:
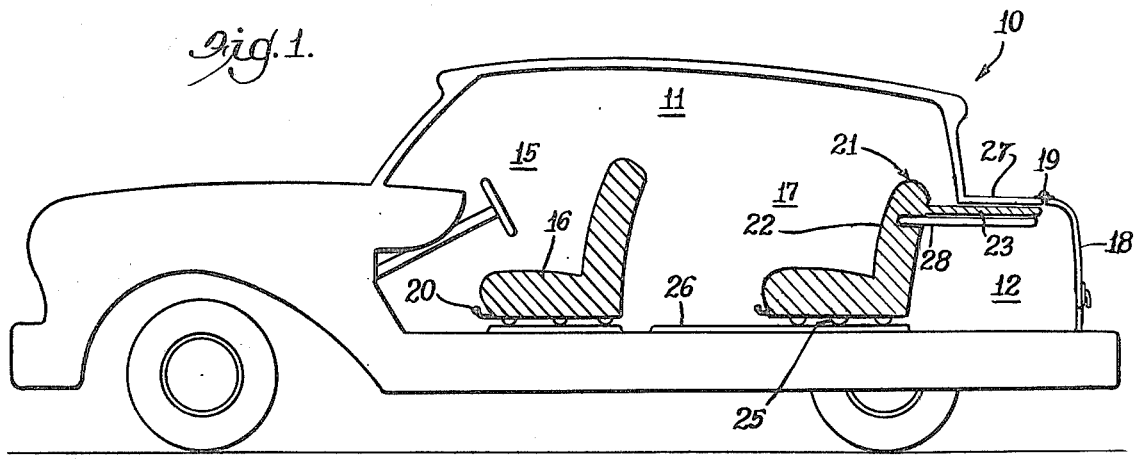
FIG. 1 is a cutaway, schematic side view of a vehicle embodying the principles of the present invention and showing the rear seat moved to its extreme rearward position, and, FIG. 2 is the same vehicle as shown in FIG. 1, but with the rear seat moved to its extreme frontward position.

Referring now to the drawings, there is shown a vehicle designated generally 10 having an internal passenger compartment 11 and a storage compartment or trunk 12. Passenger compartment 11 includes a front portion 15 containing seating 16 therein, and also a rear portion 17 of sufficient dimensions to contain one or more passengers. The passenger compartment 11 is conventionally accessible by doors (not shown), and trunk 12 is also conventionally accessible, as by lid 18 hinged at 19. Front seating 16 is adjustable perhaps 6 inches forwardly and rearwardly to accommodate differently sized drivers and/or passengers. The details of these well known mechanisms that permit forward and rearward adjustment of the front automobile seat is not pertinent to the invention at hand, however many such mechanisms are well known and in use in essentially all such vehicles. Suffice it to say here that such seats normally include a lever, such as at 20, that permits release of the seat engagement means and permits the seat occupant to slide his seat either forwardly or rearwardly to a new and more desirable location.

Interposed between passenger compartment 11 and storage compartment 12 are combination partition and seat means 21. Combination means 21 include a seat portion 22 and a selectively expandable or retractable rear shelf 23. As with the front seating 16, means 16 include cooperating means 25 that engage the floor of the vehicle for selectively and incrementally moving combination means 21 forwardly and rearwardly.

Referring back now to rear shelf 23, it can be seen in FIG. 1 that rear shelf 23 is attached to seat portion 22 at its upper and rear extremities, and further that it slides adjacent but immediately below the rear and upper external surface 27 defining in part the storage compartment volume. A support or bracket 28 is fixedly arranged within the trunk to support shelf 23 and guide its travel. In some designs it may be desirable to recess the back of seat portion 22 to accept the leading edge of bracket 28 to provide additional travel for the rear seat.

Figure 2:
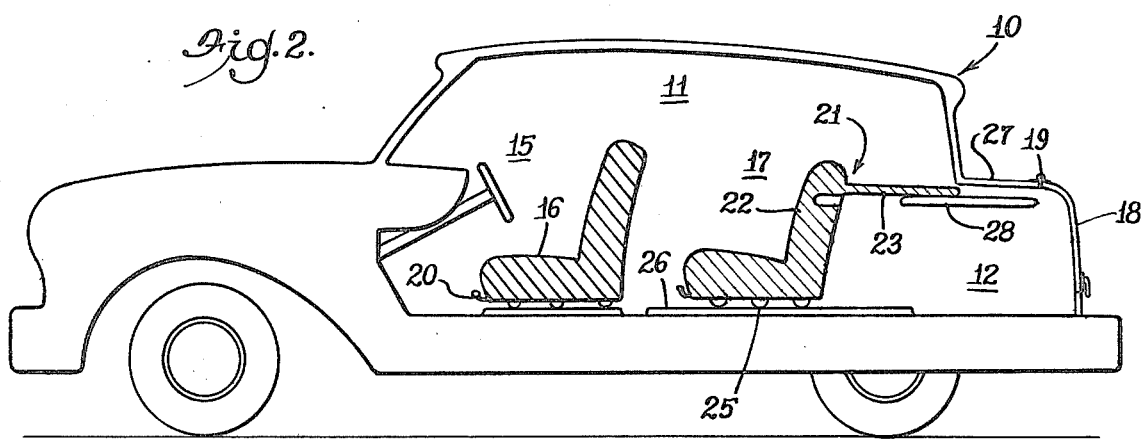

FIG. 2 shows combination means 21 in its position furthest to the front, at which time the storage compartment 12 is of maximum volume.

Other ways of devising an expandable or contractable shelf behind the rear seat might also include telescoping sections (not illustrated), or one attached to surface 27 that folds and disappears into the back of seat portion 22.

The above disclosure is offered for public dissemination in return for the grant of a patent. Although it is detailed to ensure adequacy and aid understanding, this is not intended to prejudice that purpose of a patent which is to cover each new invented concept therein no matter how others may later disguise it by variations in form or additions or further improvements.

I claim:

1. In a self propelling vehicle having an enclosed passenger compartment and an enclosed storage compartment therebehind, said passenger compartment including a front portion containing seating and a rear portion sufficiently large to carry at least one passenger, the improvement comprising:

forwardly and rearwardly translatable, combination partition and seat means interposed between said rear portion and said storage compartment for selectively allowing a substantially linear redistribution of the volume between said rear portion and said storage compartment as said combination means are moved forwardly and rearwardly, the seat part of said combination means being shaped to conform to a seated passenger as well as facing forwardly and being situated behind said front portion seating, whereby a vehicle occupant has the option of trading rear passenger leg room for increased trunk space and vice versa without substantially changing the configuration of the seat part of the combination means;

and cooperating means attached to said vehicle and to said combination means for selectively and incrementally moving said combination means forwardly and rearwardly.

2. The improvement as described in claim 1, wherein said combination partition and seat means includes an expandable and retractable surface comprising a shelf behind the upper portions of the seat part of said combination means.

* * * * *